(12) United States Patent
Kanza et al.

(10) Patent No.: US 11,553,061 B1
(45) Date of Patent: Jan. 10, 2023

(54) HYPERLOCAL EDGE CACHE

(71) Applicant: AT&T Intellectual Property I, L.P., Atlanta, GA (US)

(72) Inventors: Yaron Kanza, Fair Lawn, NJ (US); Arun Jotshi, Parsippany, NJ (US); Raghvendra Savoor, Walnut Creek, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 17/390,240

(22) Filed: Jul. 30, 2021

(51) Int. Cl.
*H04L 67/568* (2022.01)
*H04L 67/60* (2022.01)

(52) U.S. Cl.
CPC .......... *H04L 67/568* (2022.05); *H04L 67/60* (2022.05)

(58) Field of Classification Search
CPC .......... H04L 67/2842–67/2852; H04L 67/32–67/327
See application file for complete search history.

(56) References Cited

U.S. PATENT DOCUMENTS

| | | | | |
|---|---|---|---|---|
| 10,154,109 | B2* | 12/2018 | Yanagihara | H04L 67/568 |
| 2014/0280679 | A1* | 9/2014 | Dey | H04L 67/568 709/213 |
| 2015/0032974 | A1* | 1/2015 | Deakin | H04W 36/0011 711/146 |
| 2017/0064029 | A1* | 3/2017 | Das | H04L 67/568 |
| 2019/0274069 | A1* | 9/2019 | Fan | H04L 67/63 |
| 2021/0243655 | A1* | 8/2021 | Zhang | H04L 67/568 |

OTHER PUBLICATIONS

Guo et al., "Caching in Base Station with Recommendation via Q-Learning", IEEE, pp. 1-6 (Year: 2017).*

* cited by examiner

Primary Examiner — Clayton R Williams
(74) Attorney, Agent, or Firm — Guntin & Gust, PLC; John G. Rauch

(57) ABSTRACT

Methods, systems, and apparatuses, among other things, as described herein may provide for hyperlocal edge cache. A method includes intercepting a request for a resource/entity associated with an application; determining that the request can be served from the cache, wherein the cache is connected with a base station and only serves devices directly connected with the base station; and responding to fulfill the request for the resource associated with the application.

20 Claims, 4 Drawing Sheets

US 11,553,061 B1

HYPERLOCAL EDGE CACHE

BACKGROUND

Caches have proven themselves in many areas of computing, because typical computer applications access data with a high degree of locality of reference. Such access patterns exhibit temporal locality, where data is requested that has been recently requested already, and spatial locality, where data is requested that is stored physically close to data that has already been requested. Conventional systems have not focused on cache in the domain of wireless telecommunication and cellular applications.

This background information is provided to reveal information believed by the applicant to be of possible relevance. No admission is necessarily intended, nor should be construed, that any of the preceding information constitutes prior art.

SUMMARY

Methods, systems, and apparatuses, among other things, as described herein may provide for hyperlocal edge cache. In an example, an apparatus may include a processor and a memory coupled with the processor that effectuates operations. The operations may include intercepting a request by a mobile device (e.g., HTTP request) for a resource/entity associated with an application; determining that the request can be served from the cache, wherein the cache is connected with a base station and only serves devices directly connected with the base station; and responding to fulfill the request for the resource associated with the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

In the field of telecommunications, particularly mobile telecommunications, it is beneficial to reduce latency when using applications. Instead of storing objects in a cache that covers a large area, such as a state or city, it may be worthwhile that the cache be located closer to the user, such as being attached near a wireless antenna (e.g., integrated into the base station or the cell tower).

The disclosed subject matter for a hyperlocal cache may have one or more of the following aspects. In a first aspect, cache may be hyperlocal for serving a local area covered by a single or a few cellular antennas—this may assist in providing very low response time. The local area may be defined by a street block, a stadium (e.g., sports or other entertainment venue), or other venue (e.g., restaurant, medical center, university campus, transportation hub, amusement park, or shopping mall). In a second aspect, the cache may support hyperlocal geo-blocking for applications that are geographically bounded. Therefore, global positioning system (GPS) or other location services may be used to bound the use of applications, even within a venue. In a third aspect, the hyperlocal cache may be integrated into a base station instead of being a separate device, which may assist in further restricting the use of the hyperlocal cache in only serving the area covered by the base station. In a fourth aspect, for very low latency, the cache may be associated with the transport layer of the open systems interconnection (OSI) model rather than with the application layer (e.g., the TCP/IP layer rather than at the HTTP layer). Such a hyperlocal cache may significantly affect performance of local 5G applications in which latency is a significant consideration, e.g., gaming, virtual reality, streaming video, or navigation apps, among other things.

Figure 1:
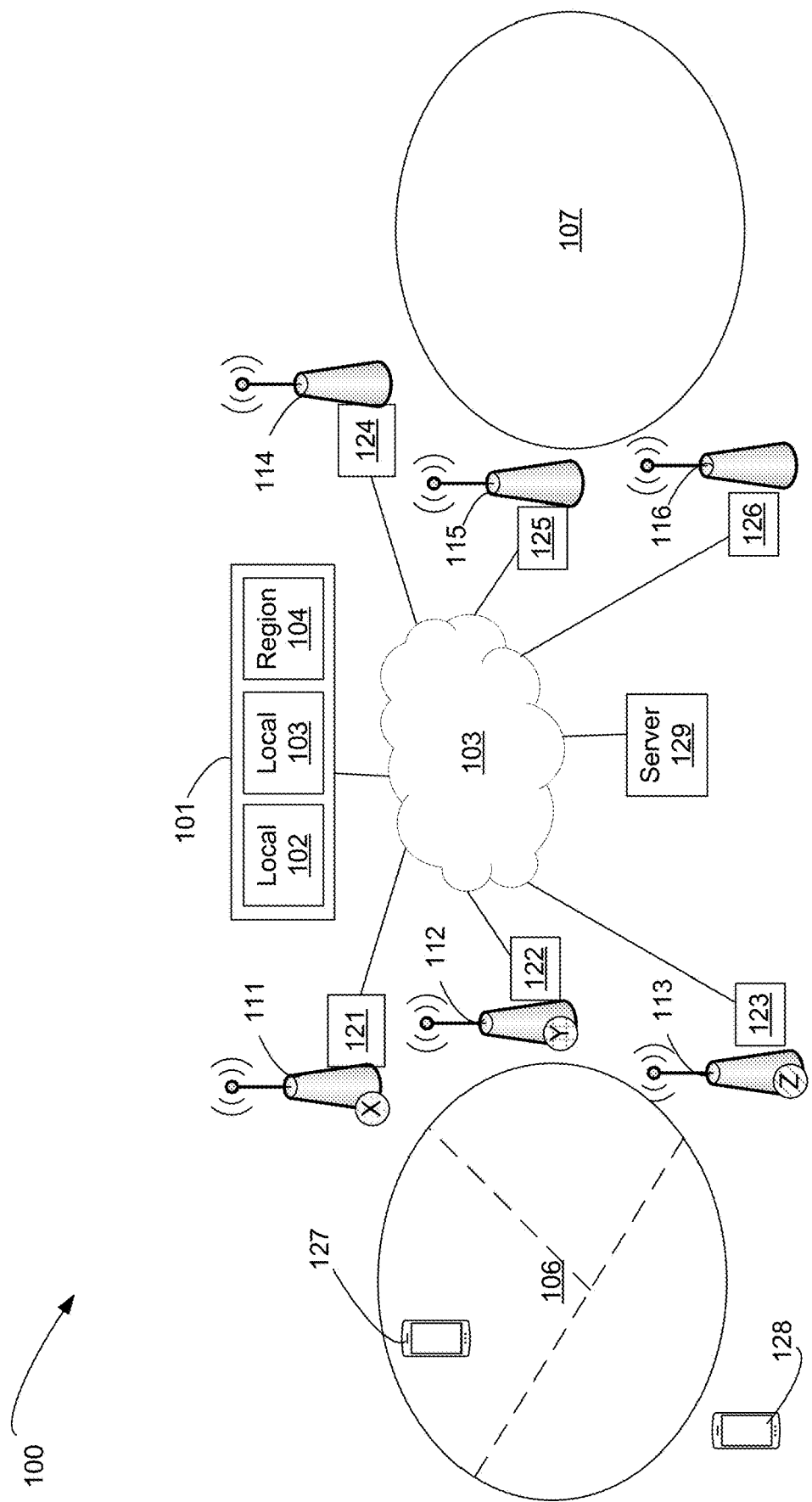
FIG. 1 illustrates an exemplary system for a hyperlocal edge cache.

FIG. 1 illustrates an exemplary system for a hyperlocal edge cache. System 100 may include multiple devices, such as base station 111—base station 116, server 101, mobile device 127 (within local area 106), mobile device 128 (outside local area 106), and cache device 121—cache device 126 connected with network 103. Base station 111—base station 113 and respectively connected cache device 121—cache device 123 may service local area 106. Base station 114—base station 116 and respectively connected cache device 124—cache device 126 may service local area 107. Local area 106 or local area 107 may be a venue, such as a stadium. In an example, local area 106 itself may be further subdivided. The subdivision of local area 106 may allow for devices with a location (e.g. GPS coordinates) in the subdivided area to be serviced by respective base stations and cache devices. Note that although a base station, such as base station 111 may have enough signal strength to service the entirety of local area 106, there may be geo-blocking restrictions that only allow devices in the subdivided area to connect with base station 111 and corresponding cache device 121. Note other ways for discovering location is contemplated herein. For example, in a stadium, a user may scan a QR code near their location (e.g., on their seat) which may be solely or partly used to discover the location of the user and direct mobile device 127 to the appropriate cache device 121.

With reference to geo-blocking per coverage areas of antennas (e.g., base station), in the areas covered by an antenna the request will be served from the cache. In other areas, the request will not be served. This supports geo-blocking, which includes limiting the content in the cache, which may be unique, to a restricted area. Note that this is based on the ability to push the content (e.g., video, figure, html file, etc.) to the cache of some base stations and not add it to the cache of others.

Server 101 may include functions (e.g., virtual machines) that provide different services, such as local function 102, location function 103, or region function 104. Local function 102 may be used to service the cache devices associated with area 106. Local function 103 may be used to service the cache devices associated with local area 107. Region function 104 may be used to service the cache devices associated with a region (not shown), in which a region is larger than multiple local areas. In an example, local function 102 may be used to primarily or solely update hyperlocal caches that service area 106, such as cache device 121—cache device 123. By serving a local area from the cache, users in different areas could get a different service or see different data (e.g., X-base station 111, Y-base station 112, or Z-base station 113), if the cache device 121 in the different places has different content. This will facilitate the adaptation of services and applications to the hyperlocal position of the user. To create this, the application provider may push to the cache the appropriate data per each location.

In addition, the update to the hyperlocal cache may be tailored advertisements for the demographics or other information associated with the venue or users (e.g., mobile devices) serviced by base station 111. Such information may include an indication of particular professional football team playing at a prescribed time, particular types of mobile devices being used in local area 106 (e.g., particular device types may use particular services in which cache usage may be beneficial), an indication that a majority of users who reside or work in particular neighborhoods, nationality, religion, employment, education, income, marital status, birthday, age, ethnicity, mobile device applications loaded, or mobile device usage statistics, among other things. In an example, image in an ad, video game, or the like may be different in different locations, to accommodate the features of different areas like ethnicity or religion of the population in the area. For instance, a figure in an online video game may be slightly different in an area where certain colors might be considered offensive or have a political affiliation. Since the content may be served from the cache, the service provider may not need to know the identity of the user (which may protect privacy), just that the user (e.g., mobile device 127) is connected wirelessly to base station 111. In an example, the service provider may just push the proper figure to the cache of base station 111, and any mobile device connected to this base station (e.g., mobile device 127) will receive the modified image from the cache. Note that the service provider can know which base station served which mobile device, but it does not need to know.

Figure 2:
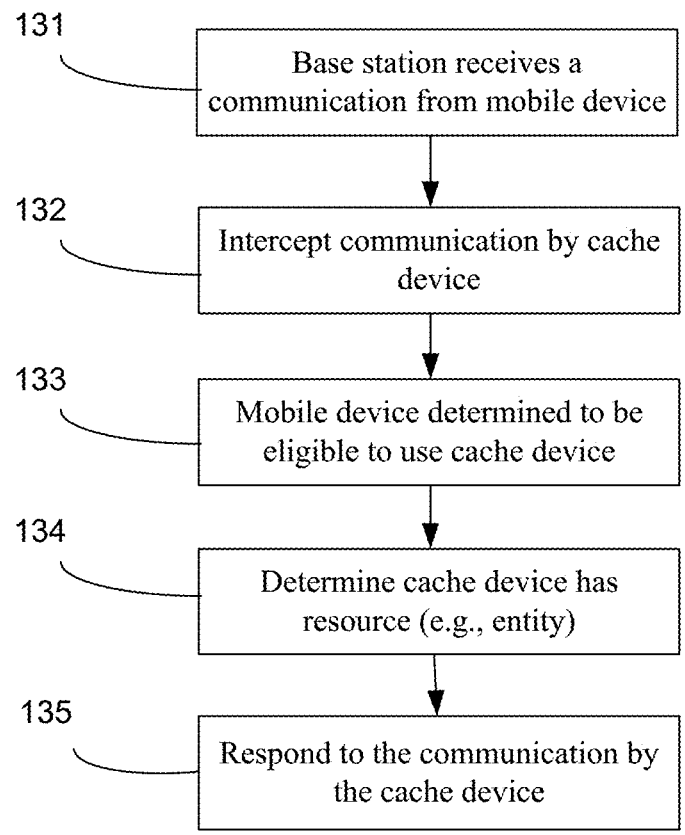
FIG. 2 illustrates an exemplary method for hyperlocal cache.

FIG. 2 illustrates an exemplary method for hyperlocal cache. At step 131, base station 111 may receive a communication from mobile device 127. Mobile device 127 may communicate wirelessly to base station 111. The communication of mobile device 127 may be for an application of mobile device 127, which may be a request for a resource. At step 132, cache device 121 may intercept the communication. At step 133, cache device 121 may determine that mobile device 127 is eligible to be served by cache device 121 based on information, such as mobile device 127 direct wireless connection with base station 111. Local area 106 is served by base station 111. The information may include GPS coordinates of mobile device 127, an indication that mobile device 127 is connected with base station 111 or other base stations (e.g., base station 122 or base station 123), or scanned QR codes, among other things. Cache device 121 may be a virtual device or physical device connected with base station 111. At step 134, based on mobile device 127 being serviced by cache device 121, determining whether the a resource associated with the application is in the cache. At step 135, when the resource is in the cache device 121, responding to the communication. This response may be in lieu of sending the communication to a remote serer. Note if the resource is not in the cache device 121, then the communication may continue to be sent to the remote server (e.g., server 101). A resource can be a file like video, music file, photo, web page, text, map, 3D representation of a figure in a game, etc.

Additional perspective is provided below with regard to hyperlocal edge caches. Hyperlocal edge cache may be used for supporting companies like Akamai that provide geospatial services and need a local cache and applications that require a very low latency, e.g., online video games. They may also be used in parallel to ordinary Web caches like those of Akamai or as part of a Content Delivery Network (CDN), in parallel to caches for larger areas. Companies that may use the service may pay a service provider (e.g., wireless service provider) for the storage space (e.g., storage on cache device 121) and the processing time utilized on the edge equipment (e.g., cache device 121). Examples of such companies are video game companies that would lease space on the cache for decreasing latency, advertising companies that will lease space on the cache for geographically targeted campaigns, and companies that provide local services.

A reverse HTTP proxy may be a way to reduce the load on servers, but it may require a request-redirect-request sequence until the content can be delivered, which increases the latency. To reduce the steps and also reduce the latency a lower-level approach may be used (e.g., the TCP/IP level rather than the HTTP level). With reference to step 133, cache device 121 may examine internet protocol (IP) packets intended for server 129 which may be service applications on a more global level. If cache device 121 cannot handle a request or other communication associated with an application for mobile device 127, cache device 121 may send (e.g., tunnel) the request to the intended server (e.g., server 129), transparently. If cache device 121 can handle the request, it does that from the local cache by pretending to be server 129 and returning an immediate response (creating a response that may be identical to the response that server 129 would have made). Cache device 121 may have some or all the information needed for "pretending" to be server 129, including security certificates, encryption keys, etc. This may allow cached device 121 to create the same response server 129 would have created, but with significantly lower latency. This approach may be analogous to a man-in-the-middle attack, except that it is done by a device on behalf of server 129. Handled requests may be reported to server 129, so server 129 may be able to more quickly continue sessions and respond to requests that cache device 121 cannot handle.

Hyperlocal cache as disclosed herein may locally store information that is used in locally bounded areas, such as local area 106, and may serve them faster than conventional systems. In an example scenario, a navigation service may need to send detailed maps and images to a navigation application of mobile device 127. Users are provided information for the area in which they are currently driving or walking. After determining the mobile device 127 is being served by base station 111, which is local area 106 (e.g., sports stadium), the mapping information (e.g., geospatial information) for local area 106 may be automatically stored (e.g., uploaded by local function 102) on cache device 121 and delivered from it. Cache device 121 may store objects like videos, images etc. Cache device 121 may store maps of the area or objects that are unique for the served area. This is local adaptation that can be created by storing different variations of the entity (e.g., resource) in different cache devices 121. This is not necessarily storage of just location information, there is storage of entities adapted to the location. This technique uses local data and users (e.g., stadium users or stadium users assigned to a particular section of the stadium), sparing the need to access a busy remote server (e.g., server 129).

In addition, the disclosed subject matter may allow for hyperlocal geo-blocking. Hyperlocal geo-blocking may limit access to content, restricting it to a small area (e.g., local area 106 or a subdivided area within). In an example, this may be achieved by storing content on the edge cache (cache device 121) and only allowing access to the content when mobile device 121 is connected almost directly to cache device 121 (e.g., one hop via to the base station or connected directly to the base station). For additional context, consider the release of a movie in a small area, say for a local film festival (e.g., Tribeca). To make sure that only mobile devices that are currently located at the local film festival can access the content, the content may be pushed from local function 102 of server 101 or server 129 to the cache device 121 which may be located within local area 106. Any request for the content that may reach the main server (e.g., server 101 or server 129) may be responded with an indication of an access denied (e.g., access denied message). In addition, a request from mobile device 128 (which may be outside local area 106) may receive an indication of access denied. As provided, a request, from local area 106, may be intercepted and the request may be delivered locally to cache device 121 so it can respond to the request or forward the request. For example, served directly from cache device 121, by sending the response with the requested entity from the cache.

As disclosed herein, an origin server (e.g., remote server 129) may reserve (e.g., lease) space on a cache-managing edge server (e.g., cache device 121) that is part of the base station 111. On cache device 121, server 129 may store content, e.g., File F, and may provide keys and certificates that may allow cache device 121 to respond on behalf of server 129. Suppose that the IP address of server 129 is A=122.123.124.125. Cache device 121 may examine the destination of every packet and may not touch packets that have a destination other than address A, i.e., 122.123.124.125 (or any other address that was set for interception). When getting packets for the designated server 129, cache device 121 may establish the TCP handshake with mobile device 127 and may examine the content of the message. If the request is for file F, then the file will be delivered from cache device 121. In an example scenario, local function 102 may put different objects like file F, on different edge caches (e.g., cache device 124 or cache device 125), to make local adaptations. For example, a character in an online game may have a different look (e.g., clothes, facial hair, athletic build) in different places (e.g., local area 106 versus local area 107), which may be based on local, cultural, or other information (e.g., demographics of a user or nearby users).

To limit interception of packets, cache device 121 may intercept packets based on a combination of internet protocol (IP) and port number rather than based merely on IP address. Moreover, in some cases the content in the cache may be associated with a fake IP address, that is, an address A' that does not belong to any server. Packets to address A' may be intercepted and may be retrieved from the cache. For example, a web page that includes an image may have a link to an image using IP address A'. In this case, the request to address A' may be caught by cache device 121 and may be handled by using the content in the cache (cache device 121). A hybrid approach may be used to build cellular application that can ask for a file or some content from both the fake address A' and the address A of server 129. The content that would arrive first would be used. If the content is in the edge cache it will be retrieved immediately. If it is on the server 129, it may arrive with a usual latency of getting a file from server 129.

Gaming may be a significant use case of hyperlocal edge cache. Hyperlocal edge cache for gaming may be useful for transmitting large file size objects directly from cache device 121, e.g., serving from the cache 3D models of figures and scenes. For instance, consider a shooting game that occurs in a virtual model of the current environment of the user. For a user in Thomas St., Manhattan, the shooting game will take place in a virtual environment that portrays Thomas Street. For a user in Akard St. Dallas, Tex., the game will take place in a virtual view of Akard Street, etc. If the user turns around, new objects are retrieved from the local cache, with very low latency. Cache device 121 may reflect local changes and local events. In addition to gaming, the hyperlocal cache could support video services, navigation apps, virtual reality applications for local stores, various localized AR/VR applications, etc.

It is contemplated that base station 111 may be connected with multiple cache devices 121 that are on the premises of the venue. It is contemplated that the usage of a cache device on premise may be based on an end user device (e.g., mobile device 127) connecting directly with one or more base stations (e.g., base station 111 and base station 112 may be serviced by cache device 121 and cache device 122). Even though mobile device 128 may be able to connect to network 103 through base station 111, because of the location of mobile device 128 outside of local area 106 it may not be authorized to connect with cache device 121 or otherwise utilize cache device 121.

The conventional use of a typical reactive cache is that the cache reacts by storing requested data when it is retrieved from the server. However, the disclosed approach provides a cache device 121 that may be a proactive cache in which companies and organizations push content to the edge cache, e.g., data of local applications that they push to the cache device 121 for improving the service they provide. Companies could lease space on the cache device 121 and store data on it proactively or change the data according to their policy. The space on the cache device 121 may be leased to organizations who may push content to cache device 121, instead of using a traditional cache replacement policy.

Figure 3:
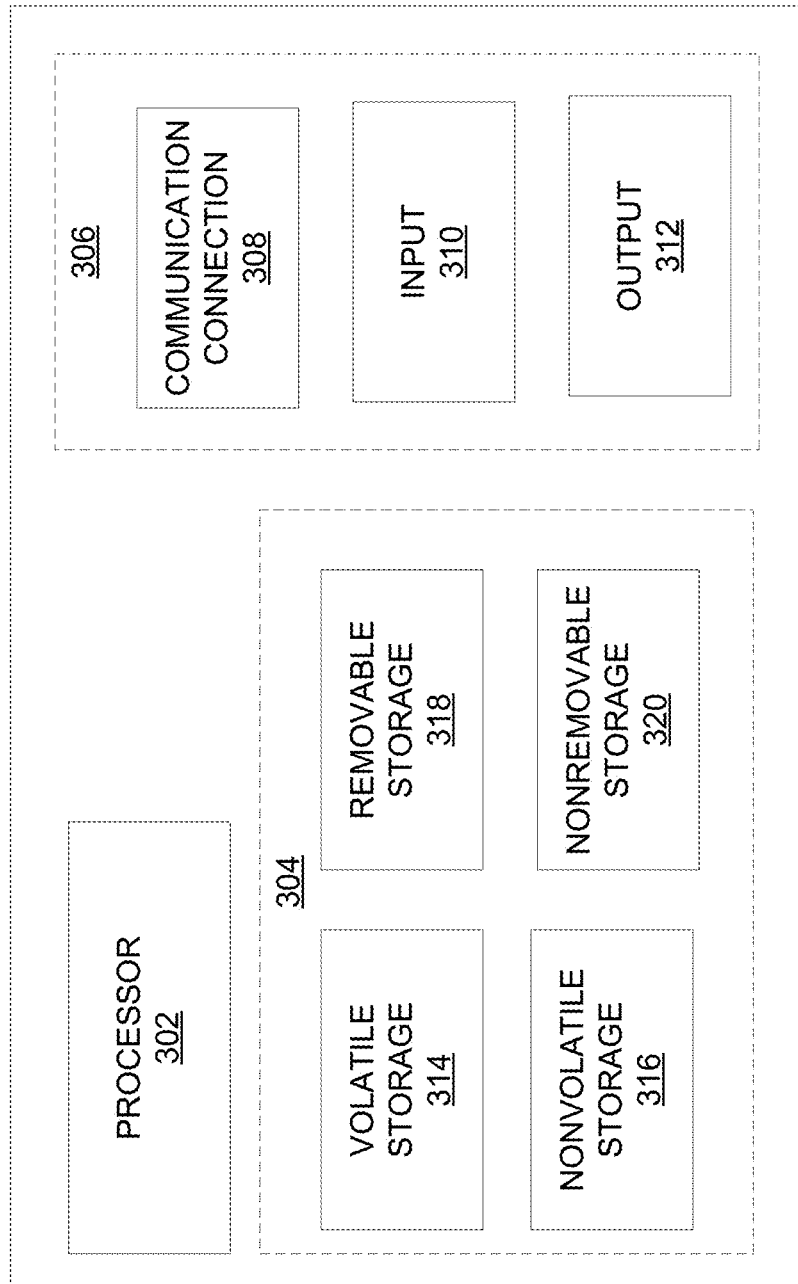
FIG. 3 illustrates a schematic of an exemplary network device.

FIG. 3 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/5G) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
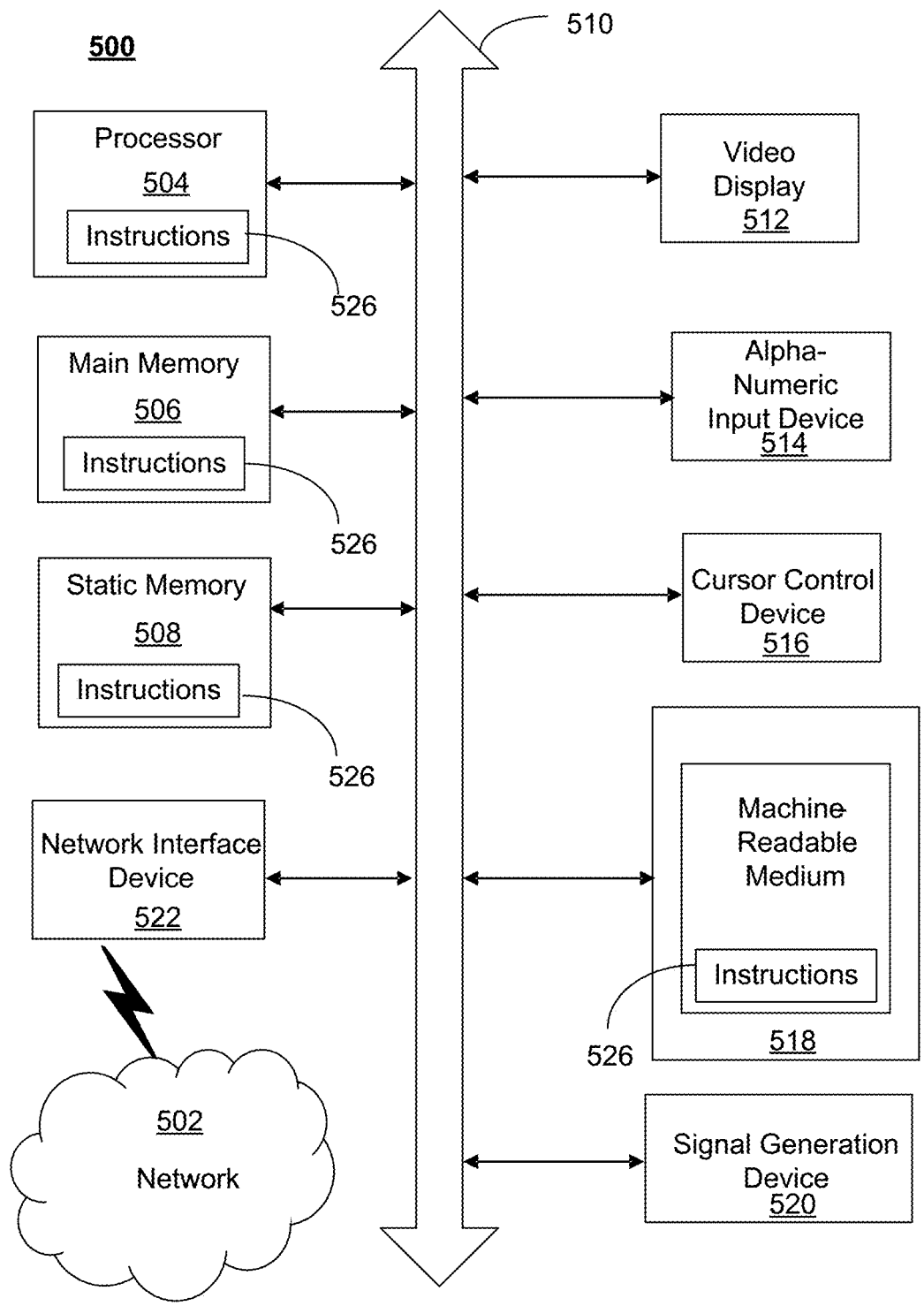
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, base station 111—base station 116, cache device 121—cache device 126, mobile device 127, server 101, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which hyperlocal edge cache associated messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—hyperlocal edge cache—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for hyperlocal edge cache. A method, system, computer readable storage medium, or apparatus provides for receiving a request to use a telecommunications service (e.g., application); determining the request for the telecommunications service is from a base station that is directly connected with a mobile device, wherein the base station is connected with a cache device, wherein the cache device is located at a local area (e.g., venue); determining the mobile device and the base station are located within the local area; and based on the mobile device and the base station being located within the local area, directing communications for the telecommunications service to the cache device in order to obtain cached information associated with the telecommunications service. The base station is one routing hop or two routing hops from the cache device. The cache device is a virtual function that is integrated into the base station. The method, system, computer readable storage medium, or apparatus provides for receiving an update for the cache device based on demographics associated with mobile devices within the local area. The method, system, computer readable storage medium, or apparatus provides for sending an invitation to lease the cache device based on the demographics associated with mobile devices within the local area. The method, system, computer readable storage medium, or apparatus provides for automatically leasing (e.g., reserving) the cache device for a service provider (e.g., providing permissions for the service provider to upload content to the cache device in order to operate with the associated application), based on the information (e.g., demographics) associated with mobile devices within the local area. An application may be a gaming application, word processing application, a video streaming application, or the like. All combinations in this paragraph (including the removal or addition of steps) are contemplated in a manner that is consistent with the other portions of the detailed description.

A method, system, computer readable storage medium, or apparatus provides for intercepting a request for a resource/ entity associated with an application; determining that the request can be served from the cache, wherein the cache is connected with a base station and only serves devices directly connected with the base station; and responding to fulfill the request for the resource associated with the application. A method, system, computer readable storage medium, or apparatus provides for determining whether there is cached information responsive to the request; when there is cached information responsive to the request, sending a response for the application; when there is no cached information responsive to the request, forward the request associated with the application. In an example method, receiving, by the cache from a server, content for the application, wherein the content for the application of the cache of the base station is different from a cache of a nearby base station. Therefore, if the first device connects with a first base station with a first cache, and then moves to a second base station with a second cache, the content for the application will be different. Different may include different logos for the application or other displayed items, different audio used by the first device for the application, or the like. The disclosed subject matter may allow for having slightly different objects in the local cache, supporting of localization in online video games, geo advertising and navigation apps. The intercepting of the request may be based on detection of TCP/IP layer information. rather than at the HTTP layer, which may decrease latency and save the round trip of redirection. The disclosed subject matter may provide for localization of services without requiring users to overtly reveal their location. All combinations in this paragraph and the above paragraph (including the removal or addition of steps) are contemplated in a manner that is consistent with the other portions of the detailed description.

What is claimed:

1. A method comprising:
    intercepting a request for a resource associated with an application of a first device that is wirelessly connected with a base station;
    determining whether the first device is wirelessly connected with the base station and the first device is in a local area served by the base station;
    determining whether the request for the resource associated with the application can be served from a cache, wherein the cache is connected with the base station and wherein the determining whether the request for the resource associated with the application can be served from the cache is responsive to determining the first device is wirelessly connected with the base station and the first device is in the local area served by the base station, and wherein the cache is restricted to responding to devices wirelessly connected with the base station; and
    when the request for the resource associated with the application can be served from the cache, responding to the request for the resource associated with the application of the first device.

2. The method of claim 1, further comprising:
    determining the request for the resource associated with the application cannot be served from the cache, wherein the determining the request for the resource associated with the application cannot be served from the cache is responsive to determining the first device is either not wirelessly connected with the base station or the first device is not in the local area served by the base station; and
    when the request for the resource associated with the application cannot be served from the cache, forwarding the request for the resource associated with the application of the first device.

3. The method of claim 1, further comprising receiving, by the cache from a server, content for the application, wherein the content for the application of the cache of the base station is different from a cache of a nearby base station.

4. The method of claim 1, wherein the intercepting of the request is based on detection of TCP/IP layer information.

5. The method of claim 1, further comprising:
    receiving, by the cache, a second request for the resource associated with the application of a second device that is not wirelessly connected with the base station; and
    rejecting the second request for the resource associated with the application of the first device.

6. The method of claim 1, wherein the cache is a virtual function that is integrated into the base station.

7. The method of claim 1, further comprising receiving an update for the cache based on demographics associated with devices connected with the base station.

8. The method of claim 1, wherein the base station covers the local area the local area comprising a sports venue.

9. A system comprising:
    one or more processors; and
    memory coupled with the one or more processors, the memory storing executable instructions that when executed by the one or more processors cause the one or more processors to effectuate operations comprising:
    receiving data from a remote source;
    storing the data at a cache device, wherein the cache device is connected with a base station, wherein the data is restricted to access by devices wirelessly connected with the base station and devices in a local area served by the base station;
    intercepting a request for a resource associated with an application of a first device that is wirelessly connected with the base station;
    determining, from the request, a destination for the request;
    determining whether the request for the resource associated with the application can be served from the cache device, wherein the cache device is restricted to responding to devices wirelessly connected with the base station and devices in the local area served by the base station, wherein determining the request can be served from the cache device is responsive to the destination for the request matching the remote source; and
    when the request for the resource associated with the application can be served from the cache device, responding to the request for the resource associated with the application of the first device.

10. The system of claim 9, wherein the base station is one routing hop or two routing hops from the cache device.

11. The system of claim 9, wherein the cache device comprises a virtual function that is integrated into the base station.

12. The system of claim 9, the operations further comprise:
    determining the request cannot be served from the cache device, wherein determining the request cannot be served from the cache device is responsive to the destination for the request not matching the remote source; and when the request for the resource associated with the application cannot be served from the cache device, forwarding the request for the resource associated with the application of the first device to the remote source.

13. The system of claim 9, the operations further comprising receiving, by the cache device from a server associated with the remote source, content for the application, wherein the content for the application of the cache device of the base station is different from a second cache device of a nearby base station.

14. The system of claim 9, wherein the intercepting of the request is based on detection of TCP/IP layer information.

15. The system of claim 9, the operations further comprising:

receiving, by the cache device, a second request for the resource associated with the application of a second device that is not wirelessly connected with the base station; and rejecting the second request for the resource associated with the application of the first device.

16. A non-transitory computer readable storage medium storing computer executable instructions that when executed by a computing device cause said computing device to effectuate operations comprising:

intercepting, at a cache connected to a base station, a request received at the base station for a resource associated with an application of a first device that is located in a local area served by the base station;

determining whether the first device is wirelessly connected with the base station;

determining whether the request for the resource associated with the application can be served from a cache, wherein the determining whether the request for the resource associated with the application can be served from the cache is responsive to determining the first device is wirelessly connected with the base station, and wherein the cache is restricted to responding to devices wirelessly connected with the base station; and when the request for the resource associated with the application can be served from the cache, responding to the request for the resource associated with the application of the first device.

17. The non-transitory computer readable storage medium of claim 16, wherein the base station is one routing hop or two routing hops from the cache.

18. The non-transitory computer readable storage medium of claim 16, wherein the cache is a virtual function that is integrated into the base station.

19. The non-transitory computer readable storage medium of claim 16, the operations further comprising when the request for the resource associated with the application cannot be served from the cache, forwarding the request to a remote server for the resource associated with the application of the first device.

20. The non-transitory computer readable storage medium of claim 16, further comprising receiving, by the cache from a server, content for the application, wherein the content for the application of the cache of the base station is different from a cache of a nearby base station.

\* \* \* \* \*